No. 613,381. Patented Nov. 1, 1898.
W. DE C. MAY.
FLUID PUMP.
(Application filed Oct. 6, 1896.)

(No Model.)

WITNESSES: INVENTOR:

UNITED STATES PATENT OFFICE.

WILLIAM DE COURCY MAY, OF SCRANTON, PENNSYLVANIA.

FLUID-PUMP.

SPECIFICATION forming part of Letters Patent No. 613,381, dated November 1, 1898.

Application filed October 6, 1896. Serial No. 608,034. (No model.)

*To all whom it may concern:*

Be it known that I, WILLIAM DE COURCY MAY, of Scranton, in the State of Pennsylvania, have invented certain new and useful Improvements in Fluid-Pumps, whereof the following is a specification, reference being had to the accompanying drawings.

Figure 1:
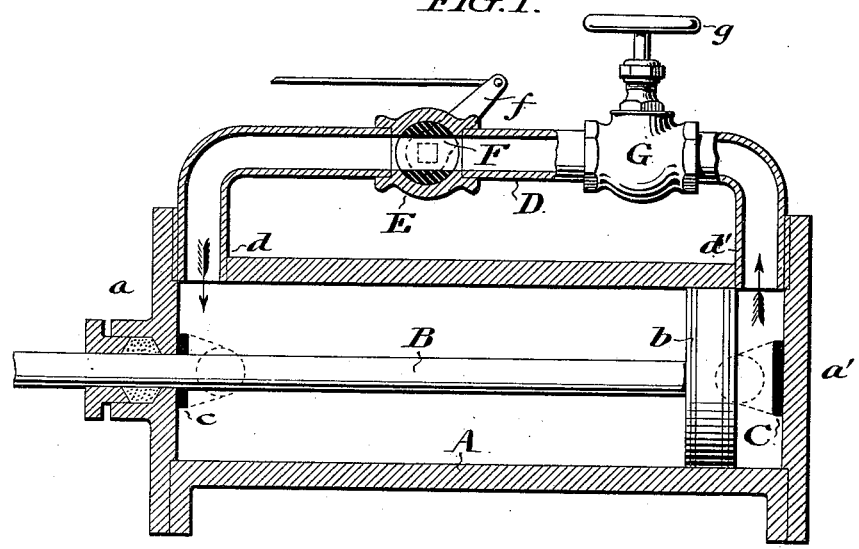
Figure 2:
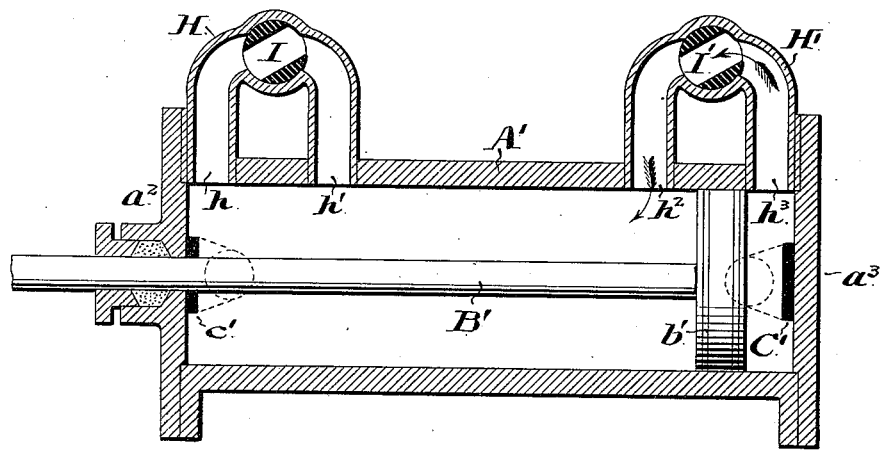

In said drawings, Figure 1 represents a vertical longitudinal section through a pump-cylinder and adjacent parts embodying my invention. Fig. 2 is a similar sectional view showing a modified form of the device.

I have selected as a typical illustration of my invention an ordinary double-acting pump in each of the above instances; but obviously the advantages are not restricted thereto, and I therefore do not limit my claim hereinafter made to the particular variety which I have found it convenient to show and describe in detail.

It is well recognized as highly desirable that fluid pumping-engines should be capable of operation at a high rate of speed in order to reduce the size of the parts to a minimum, and consequently lessen the cost of the apparatus. A practical limitation, however, is imposed upon the rapidity of operation, owing to the fact that when the pump is run beyond a certain number of strokes per minute under given conditions of pressure and character of fluid there is disadvantage due to the pounding or thumping of the valves as they seat themselves. In pumping water or other liquids or in compressing air or other fluids this pounding becomes so serious when a certain rate of speed is passed that the apparatus cannot with economy be subjected to the strain thereof. Mechanically-moved valves have been employed to overcome this difficulty, and while to a certain extent they are efficient many objections are found to them in practice. Among the more important of such objections is the necessity for an exceedingly accurate adjustment of each valve, since they cannot properly be closed as long as any fluid has to pass through them, but must be so timed as to shut exactly at the moment that the piston or plunger is reversing its movement. Not only, therefore, is great accuracy required, but the interval of time for their closing is extremely minute.

My invention is addressed to overcoming the difficulties which are experienced in running pumping-engines at a high rate of speed; and to this end I provide means whereby just before the completion and also momentarily after the commencement of the piston or plunger stroke communication may be established between that portion of the cylinder which is on one side of the piston or plunger and that which is on the other side, so that in the actual completion and during the moment of commencement of its stroke the piston shall merely displace a limited amount of the fluid by transferring it from one side of the piston to the other without requiring the passage of fluid through either the inlet or outlet valves during the brief period of completion or commencement of the stroke. Thus at the critical moment the valves are not exposed to any thumping or pounding action and are allowed a relatively large period of time in which to close before the reversal of the piston movement.

Referring to the type which is illustrated in Fig. 1, A represents the pump-cylinder, B the piston-rod, $b$ the piston-head, and C $c$ the respective ports of the valve-chamber, of an ordinary double-acting pump. Adjacent to the respective piston-heads $a$ $a'$ openings are formed in which are inserted the two ends $d$ $d'$ of a pipe D, thus forming a by-pass exterior to the cylinder through which communication may be established between the two extreme end portions thereof. A valve-chamber E is placed at a convenient point in the pipe D and contains a valve or cock F, capable of positive actuation by means of an arm $f$ from any suitable moving member of the apparatus. I also prefer to provide said pipe with a second valve-chamber G, containing an adjustable valve of any suitable character, whereby the cross-sectional area of the by-pass may be varied at will, so as to regulate the amount of fluid which shall pass through it when the valve F is open. This regulating-valve at G is controlled by means of the hand-wheel $g$, and as the construction of such valves is well understood it is not deemed necessary in this instance to illustrate it in detail. The method of operation is as follows: The piston-head $b$ is assumed to be traveling toward the right-hand end of the figure. During almost the whole period of movement in this direction the valve F has been closed; but at the instant when the head is approaching the extreme end of its stroke the valve F is opened and communication is thus established between the portions of the cylinder which are on opposite sides of the piston-head. The remainder of the piston's stroke will therefore be exerted in transferring a portion of the fluid from the area in front of it to the area behind it, the line of flow being indicated by the arrows. This of course reduces the pressure upon the exit-valve at port C and allows it to close gently at or before the reversal of the piston movement. The transfer of the fluid also causes a cessation of the intake, and the corresponding valve adjacent to the other port c is permitted to close under these conditions. Simultaneously with the commencement of the reverse stroke of the piston the valve F is closed and remains thus until just before the completion of the stroke, when it is again opened, and the last fraction of the stroke is expended in retransferring fluid from one side of the piston-head to the other in a manner similar to that before described, and the cycle of operations is again repeated.

By means of the valve at G the efficient area of the by-pass may be reduced or increased to obtain the best result under given working conditions of fluid, pressure, &c., and by nice regulation thereof any undue sacrifice of efficiency may be avoided.

Referring now to the type which is illustrated in Fig. 2, I would preface the description with the remark that the primary difference lies in the fact that the by-pass is so arranged as not to require the use of a valve whereby it is closed at specified intervals, but remains open at all times. The general parts are the same as those heretofore described, A' being the cylinder, B' the piston-rod, b' the piston-head, and C' c' the ports leading to the inlet and outlet valves at each end. Adjacent to the cylinder-head $a^2$ a U-shaped pipe H is arranged, which leads from a point $h$ in close proximity to said head to another point $h'$ a short distance therefrom, thus forming a by-pass between two points separated from one another by a short interval near one end of the cylinder. A similar pipe H' is correspondingly arranged adjacent to the other cylinder-head $a^3$, forming a by-pass between the points $h^2$ and $h^3$. Said by-pass pipes H and H' are respectively provided with controlling-valves I and I', which may be set, like the valve at G in Fig. 1, so as to regulate the efficient area of the respective by-passes. The operation of this type of apparatus is as follows: Assuming that the piston is moving toward the right-hand end of the figure, both by-passes will be, so to speak, idle during the greater part of the traverse of the piston, since whenever both ends of a given by-pass are upon the same side of the piston-head the pressure throughout the by-pass will be equal and there will be no movement therein one way or the other. So soon, however, as the piston-head passes, for instance, the point $h^2$ the remainder of the stroke will be taken up in transferring fluid in the direction of the arrows at the right-hand end of Fig. 2 from the front to the rear of the piston-head, and as the completion of the stroke is reached the inlet and outlet valves at the ports C' c' will close quietly. Immediately at the commencement of the return stroke there will be a brief period during which communication will be open through the by-pass H' from the front to the rear of the piston and a momentary transfer of fluid will occur; but so soon as the piston has passed the opening $h^2$ the normal action of the pump will proceed and continue until the opening $h'$ has been passed, when communication will be established through the by-pass H from the front to the rear of the piston and during the minute fraction of the stroke which follows the retransfer of fluid will occur with the same result as before. The control of the efficient area of the by-pass pipes H and H' by means of the valves I and I' enables this type of apparatus to be so adjusted as to cause the minimum displacement of fluid which is consistent with proper working.

It will thus be seen that the common principle of operation consists in permitting the transfer of fluid from one side of the piston-head to the other at definite periods of the piston's travel, said periods being those which include the movements of the respective valves at the inlet and outlet ports, and the transfer of fluid takes place in both directions. The means whereby this transfer of fluid is limited to the specific periods depend in the one case upon the positive movement of a valve and in the other case upon the movement of the piston itself, according to the location of the points between which the by-pass communicates. Hence under my broader claim, hereinafter made, I desire to include both types of apparatus. I also desire to comprehend under the term "piston," as used in said claim, any moving member, such as a piston or plunger, by whose action the intake and expulsion of fluid is effected.

I am aware that it is not broadly new to provide means whereby equilibrium may be established between fluid which is on the delivery side of the piston and that which is behind the piston at or near the completion of the piston stroke; but such devices as heretofore constructed affected only the delivery-valve, since the passage through which the equilibrium is effected is only open for the movement of fluid in one direction. In my device the passage is open for the transfer of fluid in both directions, and hence relieves both the delivery and intake valves at the critical moment by permitting the actual transfer of fluid from one side of the piston-head to the other during not only the completion of the piston stroke, but momentarily after the commencement of the return stroke.

Having thus described my invention, I claim—

The combination, in a double-acting pump, with the pump-cylinder having valved ports C, c, in its ends, and the piston working in the cylinder, of an external pipe connecting the two ends of the cylinder, a valve in the said pipe having a through-passage to register with bore of said pipe, and means for positively opening the valve just as the piston reaches the end of its stroke in both directions and positively closing it as soon as the piston begins its return stroke in both directions; whereby both sets of valves at C-c will be permitted to close noiselessly, substantially as described.

WILLIAM DE COURCY MAY.

Witnesses:
L. F. BOWER,
L. D. PETTIT.